United States Patent
Frempong et al.

(10) Patent No.: US 10,109,215 B2
(45) Date of Patent: Oct. 23, 2018

(54) ACADEMIC INTEGRITY PROTECTION

(71) Applicant: Pearson Education, Inc., Upper Saddle River, NJ (US)

(72) Inventors: Derek K. Frempong, Perry Hall, MD (US); Gi-Young Paek, Ellicott, MD (US); Andrew M. Silverman, Ellicott City, MD (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 866 days.

(21) Appl. No.: 14/256,857

(22) Filed: Apr. 18, 2014

(65) Prior Publication Data

US 2014/0315181 A1 Oct. 23, 2014

Related U.S. Application Data

(60) Provisional application No. 61/813,958, filed on Apr. 19, 2013.

(51) Int. Cl.
*G09B 7/00* (2006.01)
*G09B 7/02* (2006.01)

(52) U.S. Cl.
CPC ..................................... *G09B 7/02* (2013.01)

(58) Field of Classification Search
CPC .......... G06F 21/32; G06F 21/31; G06F 21/46; G06F 21/552; G09B 7/00; G09B 19/00; G09B 7/02
USPC ................................ 434/322, 323, 350, 362
See application file for complete search history.

(56) References Cited

U.S. PATENT DOCUMENTS

| 6,256,737 | B1 * | 7/2001 | Bianco | G07C 9/00158 |
| | | | | 713/186 |
| 2012/0244508 | A1 * | 9/2012 | Katz | G09B 7/00 |
| | | | | 434/362 |

* cited by examiner

*Primary Examiner* — Jerry Fletcher
(74) *Attorney, Agent, or Firm* — Kilpatrick Townsend and Stockton LLP (57) ABSTRACT

Methods, systems, and devices for maintaining academic integrity are disclosed herein. In some embodiments, an academic integrity system can maintain user profile data and receive integrity data. The integrity data can include data identifying one or several attributes of an actual user. This integrity data can be compared to the user profile data to determine a likelihood that the alleged user is the actual user. The likelihood that the alleged user is the actual user is compared to an academic integrity criterion. The result of this comparison is used to determine whether to request additional integrity data or to confirm or deny the identity of the actual user.

20 Claims, 7 Drawing Sheets

Fig. 7

ACADEMIC INTEGRITY PROTECTION

CROSS-REFERENCES TO RELATED APPLICATIONS

This application claims the benefit of U.S. Provisional Application No. 61/813,958, filed on Apr. 19, 2013, and entitled "ACADEMIC INTEGRITY PROTECTION," the entirety of which is hereby incorporated by reference herein.

BACKGROUND OF THE INVENTION

This disclosure relates in general to learning and can include traditional classroom learning or on-line or computerized learning including, but without limitation, learning or instruction with a Learning Management System (LMS) and/or Online Homework System (OHS).

Maintaining academic integrity is paramount to the evaluation of student work product and the creation of an effective education system. Academic integrity has historically been maintained by teachers who know their students and their students' work. However, as computerized learning has become more prevalent, the ability of maintaining academic integrity via traditional means has been limited. Thus, better systems, methods, and devices are desired to maintain academic integrity.

BRIEF SUMMARY OF THE INVENTION

One aspect of the present disclosure relates to a method for protection of academic integrity. The method includes providing an academic task that includes an activity associated with a course of study, receiving collected integrity data that includes indicators of the identity of an actual user performing the academic task, and receiving user profile data. In some embodiments, the user profile data includes at least one indicator of the identity of an alleged user performing the academic task, which at least one indicator of the identity of the alleged user performing the academic task includes at least one of an indicator of a physical attribute of the alleged user, an indicator of a performance attribute of the alleged user, and an indicator of an interaction attribute of the alleged user. In some embodiments, the method includes generating a first score indicating the likelihood that the alleged user is the actual user performing the academic task by comparing a first portion of the collected integrity data to the user profile data, receiving an academic integrity criterion that includes a threshold, comparing the generated first score to the academic integrity criterion, and generating a value according to a Boolean function. In some embodiments, a first value is generated when the threshold is triggered and a second value is generated when the threshold is not triggered. In some embodiments, the method includes providing an indicator that the alleged user is not the actual user when the generated value indicates that the threshold is triggered.

In some embodiments of the method, the value generated according to the Boolean function is associated with the user profile data. In some embodiments, the method includes receiving an indication of the completion of the academic task. In some embodiments, the integrity data is collected during a time period between when the academic task is provided and when the indication of the completion of the academic task is received. In some embodiments, the indicator of a physical attribute of the alleged user can include at least one digital photograph. In some embodiments, the at least one photo can include a first digital photograph generated at a first moment during the time period and a second digital photograph generated at a second moment during the time period.

In some embodiments, the method can include generating a second score indicating the likelihood that the alleged user is the actual user performing the academic task by comparing a second portion of the collected integrity data to the user profile data when the generated value indicates that the threshold is triggered. In some embodiments, the method includes generating a composite score by combining the first and second scores indicating the likelihood that the alleged user is the actual user performing the academic task. In some embodiments, the method includes comparing the composite score to the academic integrity criterion; generating a value according to a Boolean function, which first value is generated when the threshold is triggered and a second value is generated when the threshold is not triggered; and providing an indicator that the alleged user is not the actual user when the generated value indicates that the threshold is triggered.

In one aspect, the present disclosure relates to an academic integrity system. The academic integrity system includes a memory that includes an academic task that includes an activity associated with a course of study, collected integrity data that includes indicators of the identity of an actual user performing the academic task, and user profile data that includes at least one indicator of the identity of an alleged user performing the academic task. In some embodiments, the at least one indicator of the identity of the alleged user performing the academic task includes at least one of an indicator of a physical attribute of the alleged user, an indicator of a performance attribute of the alleged user, and an indicator of an interaction attribute of the alleged user. In some embodiments, the memory includes an academic integrity criterion that includes a threshold. The academic integrity system includes a processor that can provide the academic task, receive the collected integrity data, receive the user profile data, generate a first score indicating the likelihood that the alleged user is the actual user performing the academic task by comparing a first portion of the collected integrity data to the user profile data, receive the academic integrity criterion, compare the generated first score to the academic integrity criterion, and generate a value according to a Boolean function. In some embodiments, a first value is generated when the threshold is triggered and a second value is generated when the threshold is not triggered. The processor can provide an indicator that the alleged user is not the actual user when the generated value indicates that the threshold is triggered.

In some embodiments, the processor can receive an indication of the completion of the academic task. In some embodiments, the processor can collect the integrity data during a time period between when the academic task is provided and when the indication of the completion of the academic task is received. In some embodiments, the processor can generate a second score indicating the likelihood that the alleged user is the actual user performing the academic task by comparing a second portion of the collected integrity data to the user profile data when the generated value indicates that the threshold is triggered. In some embodiments, the processor can generate a composite score by combining the first and second scores indicating the likelihood that the alleged user is the actual user performing the academic task. In some embodiments, the processor can compare the composite score to the academic integrity criterion, generate a value according to a Boolean function, wherein a first value is generated when the threshold is triggered and a second value is generated when the threshold is not triggered, and provide an indicator that the alleged user is not the actual user when the generated value indicates that the threshold is triggered.

One aspect of the present disclosure relates to a method for protection of academic integrity. The method includes providing an academic task that includes an activity associated with a course of study; requesting the first collection of integrity data during the performance of the academic task, which integrity data includes indicators of the identity of an actual user performing the academic task; receiving the first integrity data collected during the performance of the academic task; determining whether the collection of additional integrity data is requested; requesting the collection of additional integrity data during the performance of the academic task when it is determined that the collection of additional integrity data is requested, wherein the integrity data comprises indicators of the identity of an actual user performing the academic task; and receiving the additional integrity data collected during the performance of the academic task. In some embodiments, the method includes receiving user profile data that includes at least one indicator of the identity of an alleged user performing the academic task, generating a score indicating the likelihood that the alleged user is the actual user performing the academic task for the first integrity data and for the additional integrity data, receiving an academic integrity criterion, which academic integrity criterion includes a threshold, comparing the generated scores to the academic integrity criterion, and generating a value according to a Boolean function. In some embodiments, a first value is generated when the threshold is triggered and a second value is generated when the threshold is not triggered. In some embodiments, the method includes providing an indicator that the alleged user is not the actual user when the generated value indicates that the threshold is triggered.

In some embodiments of the method, determining whether the collection of additional integrity data is requested includes determining if the collected integrity data allows a desired degree of certainty that the alleged user is not the actual user, and requesting additional integrity data if the collected integrity data does not allow a desired degree of certainty that the alleged user is not the actual user. In some embodiments of the method, the additional integrity data includes a type. In some embodiments, the type is one of an indicator of a physical attribute of the alleged user, an indicator of a performance attribute of the alleged user, and an indicator of an interaction attribute of the alleged user. In some embodiments, the type of the additional integrity data is selected based on a uniqueness parameter. In some embodiments, the uniqueness parameter specifies the degree to which the type of the additional integrity data uniquely identifies the alleged user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides an academic integrity system including a processor, one or several databases, one or several user devices, and educational resources, and the camera. The academic integrity system collects and stores profile data from a user who is alleged to be performing an academic task. This user is referred to as the alleged user. The academic integrity system likewise collects integrity data for use in identifying the user performing the academic task. This user is referred to as the actual user. The academic integrity system compares the collected integrity data with the stored profile data to determine whether the actual user performing the academic task is the alleged user. In some embodiments, this determination can be performed at any point during the completion of the academic task, and can be, for example, performed continuously and/or randomly during the completion of the academic task. In some embodiments, the academic integrity system can further determine if other applications are open and/or running during the time of the completion of the academic task and/or determine the level of usage of other programs during the time of the completion of the academic task.

In one embodiment, the present disclosure provides a method for protection of academic integrity. This method can include, for example, providing an academic task and receiving and/or collecting integrity data during the actual user's performance of the academic task. This received and/or collected integrity data can be compared to stored profile data for the alleged user. This comparison of the stored profile data and the collected integrity data can be used to determine whether the actual user is the alleged user.

In some embodiments, for example, this comparison can result in the generation of an integrity score that can reflect the likelihood that the alleged user is the actual user. This score can be compared to an integrity criterion, and based on the comparison of the score to the integrity criteria, the actual user can be identified as the alleged user or as a user other than the alleged user.

The collected integrity data can comprise a variety of information relating to the actual user. In some embodiments, for example, the collected integrity data can be one or more of an indicator of a physical attribute of the actual user, an indicator of a performance attribute of the actual user, and an indicator of an interaction attribute of the actual user. In one embodiment, an indicator of a physical attribute of the actual user can include, for example, a still image, a batch of still images, video data, or biometric data. Biometric data can be anything that is likely to be unique to the user, for example, keystroke patterns, mouse movement patterns, interaction patterns like common misspellings, interaction patterns with software, etc. A performance attribute could include deviations from typical or expected grades, writing style, word choice, typing speed, etc. In some embodiments, the performance attribute can include a screen capture of the screen at an instant during the completion of the academic task. In some embodiments, this screen capture can be provided to a teacher and/or supervisor for review to determine if any unapproved activity or collaboration is indicated in the screen capture. Additionally, any provided identification such as password authentication, or government issued ID can be additional integrity data in one embodiment.

In some embodiments, for example, a single type of integrity data can be collected and used to determine the identity of the actual user, and in some embodiments, for example, a plurality of types of integrity data can be collected and used to determine the identity of the actual user. In one embodiment, for example, a first type of integrity data is collected and a first integrity score is generated for the first type of integrity data, and an additional type of integrity data is collected and an additional integrity score is generated. The first integrity score and the additional integrity score can be combined to determine an overall integrity score for the user performing the academic task, which score can then be used to determine if the actual user is the alleged user.

In some embodiments, for example, integrity data can be collected at different points during the performance of the academic task. Thus, in one embodiment, integrity data can be collected, for example, at a plurality of points during the performance of the academic task such as, for example, at the beginning of the academic task, at the end of the academic task, or at one or several intermediate points during the academic task. In some embodiments, the collection of integrity data at different points during the performance of the academic task can be used to provide further verification that the actual user is the alleged user.

Figure 1:
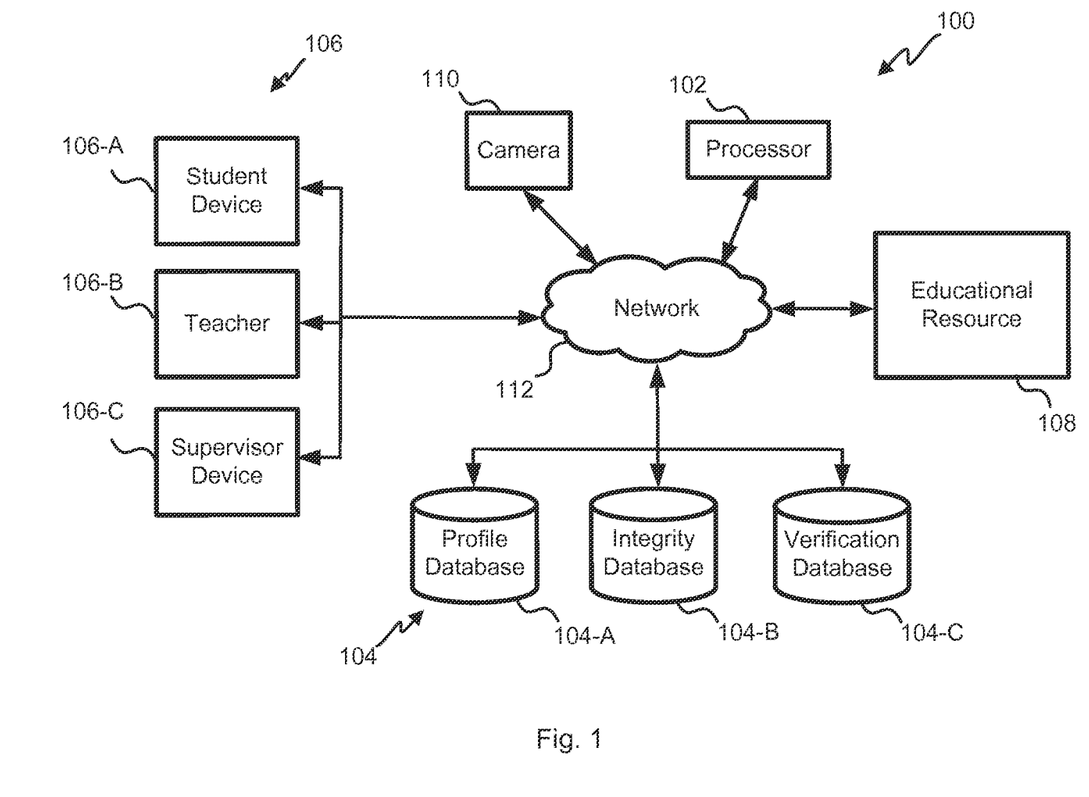
FIG. 1 is a block diagram illustrating one embodiment of an evaluation control system.

With reference now to FIG. 1, a block diagram of one embodiment of an academic integrity system 100 is shown. The academic integrity system 100 collects, receives, and stores profile data for the alleged user and collects and stores integrity data for the actual user. In some embodiments, the academic integrity system 100 can compare the profile data for the alleged user with the integrity data for the actual user to determine if the actual user is the alleged user. The academic integrity system 100 can provide an indicator to, for example, an alleged user, a teacher, and/or a supervisor indicating the result of the comparison of the profile data with the integrity data in the academic task associated therewith.

The academic integrity system 100 can include a processor 102. The processor 102 can provide instructions to and receive information from the other components of the academic integrity system 100. The processor 102 can act according to stored instructions, which stored instructions can be located in memory associated with the processor and/or in other components of the academic integrity system 100. The processor 102 can comprise a microprocessor, such as a microprocessor from Intel® or Advanced Micro Devices, Inc.®, or the like.

The academic integrity system 100 can include one or several databases 104. The one or several databases 104 can comprise stored data relevant to the functions of the academic integrity system 100. The one or several databases 104 include a profile database 104-A. The profile database 104-A can include profile data of one or several alleged users. In some embodiments, for example, the one or several alleged users can be one or several individuals participating in a course of study or performing an academic task.

In some embodiments, the profile data can include any information relating to the alleged user, the alleged user's level of education, or any other information useful in identifying the alleged user. In some embodiments, for example, the profile data can include data relating to one or more physical attributes of the alleged user, data relating to one or more performance attributes of the alleged user, and/or data relating to one or more interaction attributes of the alleged user. In some embodiments, for example, the profile data can include the alleged user's name and/or age.

In some embodiments, for example, data relating to one or more physical attributes of the alleged user can include image data of the alleged user including, for example, image data for one or several still images of the alleged user and/or image data for video of the alleged user. In some embodiments, for example, the data relating to one or more physical attributes of the alleged user can include biometric information for the alleged user. This information can include, for example, a fingerprint of the alleged user, a retina scan of the alleged user, a DNA sample of the alleged user, or any other data relating to a physical attribute of the user.

In some embodiments, for example, data relating to one or more performance attributes of the alleged user can include, for example, data indicative of the alleged user's past performance. This information can include, for example, data relating to courses of study that the alleged user has completed and/or data relating to the alleged user's performance in the completed courses of study. In some embodiments, for example, the data relating to one or more performance attributes of the alleged user can include academic tasks that the alleged user has completed and/or the alleged user's performance in the completed academic tasks. In some embodiments, for example, the data relating to one or more performance attributes of the alleged user can include an identification of information and/or topics that the alleged user has mastered and/or identification of information and/or topics that the alleged user has not mastered.

In some embodiments, for example, data relating to one or more interaction attributes of the alleged user can include, for example, information relating to how the alleged user interacts with components of the academic integrity system 100. This information can include, for example, the alleged user's patterns for providing inputs to the academic integrity system 100. In some embodiments, for example, this information can include user preferences such as the input device such as, for example, a keyboard, a number pad, a mouse, a joystick, track ball, and microphone, with which the alleged user normally provides inputs to the academic integrity system 100. In some embodiments, for example, the alleged user's patterns for providing inputs can include typing patterns, mouse click patterns, typing speed, words used by the user, words not used by the user, typing speed, which typing speed can be either a general typing speed or a typing speed for one or several words, synonym pairs that include a used and a non-used word, or any other input. In some embodiments, for example, the alleged user's patterns for providing inputs can include data relating to the alleged user's demonstrated vocabulary or relating to and/or identifying words that the alleged user typically correctly and/or incorrectly spells.

In some embodiments, for example, the profile database 104-A can comprise login information. This information can include, for example, information identifying a user such as, for example, a username and password or a user identification number. In some embodiments, for example, when a user desires to access the academic integrity system 100, the user can be prompted to enter identification information such as, for example, a username and password. After the user provides the identification information, the academic integrity system 100 can verify the identification information, and specifically, the processor 102 can compare the user-provided identification information to information stored within the profile database 104-A to determine if the actual user is an authorized user.

In some embodiments, the profile data stored in the profile database 104-A can be dynamically updated over time to reflect changes to the alleged user. In some embodiments, these changes can be, for example, a change in appearance, a change in performance, a change in a preference and/or interaction, or the like. In some embodiments, these updates to the profile database 104-A can be based on actual measured changes in the appearance, performance, preference and/or interaction, or the like, and in some embodiments these updates to the profile database 104-A can be based on a predictive algorithm which can, for example, predict changes in appearance, performance, preference and/or interaction, or the like.

The one or several databases 104 can include an integrity database 104-B. The integrity database 104-B can include integrity information collected during the performance of the academic task. This integrity information can include any information collected and/or collectible during the academic task and useful in identifying the actual user. This information can, in some embodiments, correspond to information stored in the profile database 104-A.

The academic integrity system 100 can include a verification database 104-C. The verification database 104-C can include information used in determining and/or verifying the identity of the actual user. In some embodiments, for example, this information can include algorithms and/or procedures for comparing profile data with integrity data and/or for processing results of the comparison of the profile data with the integrity data. In some embodiments, the verification database 104-C can include, for example, criteria and/or thresholds useful in evaluating the results of the comparison of profile data with integrity data.

The academic integrity system 100 can include one or several user devices 106, which can include a student device 106-A, a teacher device 106-B, and/or a supervisor device 106-C. The user devices 106 allow a user, including a student, a parent, and an educator, including a teacher and an administrator, to access the academic integrity system 100.

The details and function of the user devices 106 will be discussed at greater length in reference to FIG. 2 below.

The evaluation and optimization system 100 can include an educational resource 108. The educational resource 108 can be the source of the academic task and/or can be the source of some or all of the alleged user profile data. Thus, in some embodiments, information such as, for example, the alleged user's past academic performance including courses of study and/or academic tasks that the alleged user has completed, and the alleged user's performance in those completed courses of study and/or academic tasks can be included in the educational resource. In some embodiments, the educational resource 108 can comprise a database of one or more courses of study and/or one or more academic tasks. In some embodiments, for example, the educational resource can be a university, a school, an institution of learning, and/or a learning management system (LMS).

The academic integrity system 100 can include, for example, a camera 110. The camera 110 can be any device configured to generate image and/or audio data including, for example, still image data, video image data, and/or any sound data. In some embodiments, for example, the camera 110 can be connected to and controllable by the academic integrity system 100.

The academic integrity system 100 can include a network 112. The network 112 allows communication between the components of the academic integrity system 100. The network 112 can be, for example, a local area network (LAN), a wide area network (WAN), a wired network, wireless network, a telephone network such as, for example, a cellphone network, the Internet, the World Wide Web, or any other desired network. In some embodiments, the network 112 can use any desired communication and/or network protocols.

Figure 2:
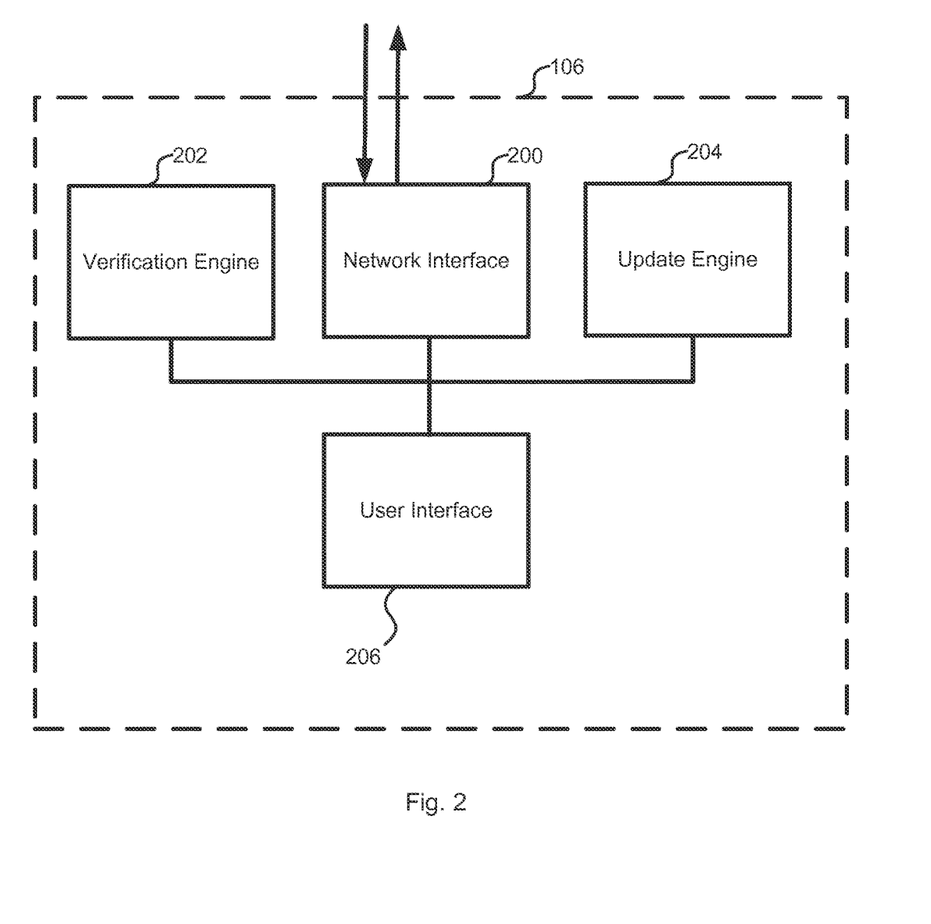
FIG. 2 is a block diagram illustrating one embodiment of a user device for use with an evaluation control system.

With reference now to FIG. 2, a block diagram of one embodiment of a user device 106 is shown. As discussed above, the user device 106 can be configured to provide information to and/or receive information from other components of the academic integrity system 100. The user device can access the academic integrity system 100 through any desired means or technology, including, for example, a webpage such as, for example, a social network service page, or a web portal. As depicted in FIG. 2, the user device 106 can include a network interface 200. The network interface 200 allows the user device 106 to access the other components of the academic integrity system 100, and specifically allows the user device 106 to access the network 110 of the academic integrity system 100. The network interface 200 can include features configured to send and receive information, including, for example, an antenna, a modem, a transmitter, receiver, or any other feature that can send and receive information. The network interface 120 can communicate via telephone, cable, fiber-optic, or any other wired communication network. In some embodiments, the network interface 200 can communicate via cellular networks, WLAN networks, or any other wireless network.

The user device 106 can include, for example, verification engine 202. Verification engine 202 can identify and/or facilitate in identifying the actual user. In some embodiments, for example, the verification engine 202 can cooperate with other components of the academic integrity system 102 to identify and/or facilitate in identifying the actual user. In one embodiment, for example, the verification engine 202 can receive integrity data and profile data and compare the integrity data to the profile data, and identify the actual user based on the comparison of the integrity data to the profile data.

The user device 106 can include an update engine 204. The update engine 204 can facilitate in updating any information within the academic integrity system 100. In some embodiments, for example, the update engine 204 can be used by a user such as, for example, a student to provide alleged user profile data. In some embodiments, for example, the update engine 204 can be used by a user such as, for example, teacher, educator, or supervisor to update alleged user profile data and/or one or several academic tasks.

The user device 106 can include a user interface 206 that communicates information to, and receives inputs from a user. The user interface 206 can include a screen, a speaker, a monitor, a keyboard, a microphone, a mouse, a touchpad, a keypad, or any other feature or features that can receive inputs from a user and provide information to a user.

Figure 3:
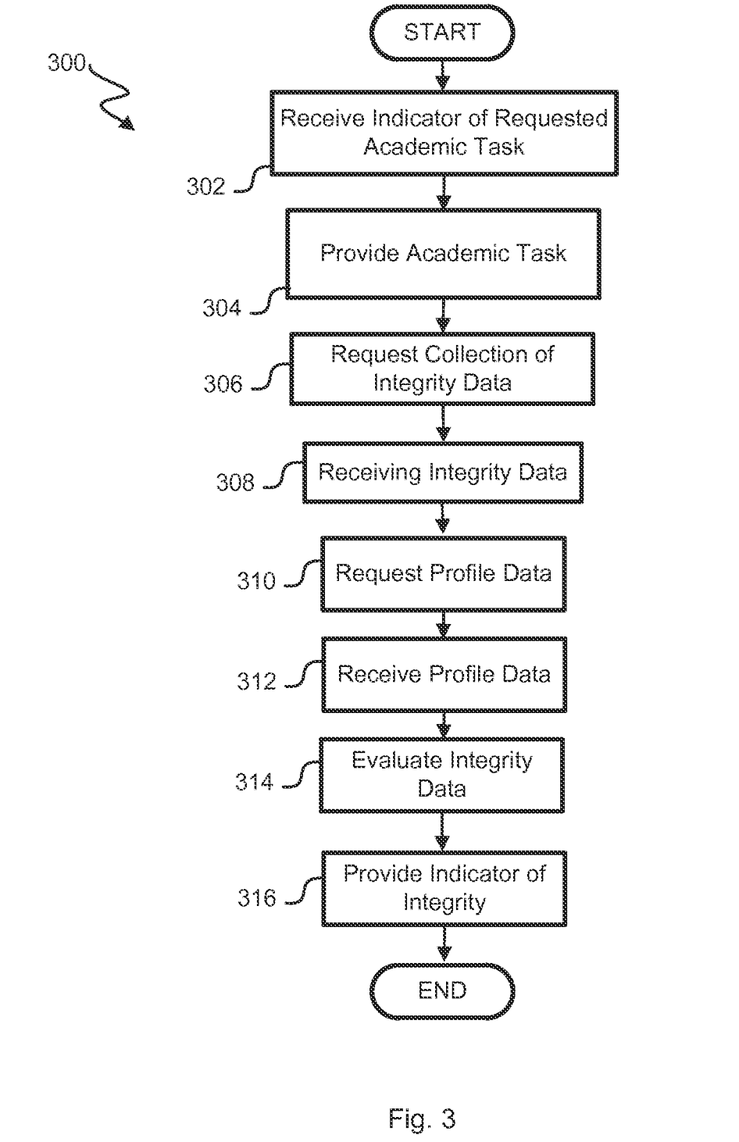
FIG. 3 is a flowchart illustrating one embodiment of a process for evaluation of one or several portfolios and/or artifacts.

With reference now to FIG. 3, a flowchart illustrating one embodiment of a process 300 for protection of academic integrity is shown. The process 300 begins at block 302 wherein an indicator of the requested academic task is received. In some embodiments, for example, the indicator of the requested academic task can be received by the processor 102 of the academic integrity system 100. In some embodiments, for example, the indicator of the request academic task can be received from one of the user devices 106 such as, for example, the student device 106-A. In some embodiments, for example, the indicator of the requested academic task can be received from the educational resource 108.

After the indicator of the requested academic task has been received, the process 300 proceeds to block 304 wherein the academic task is provided. In some embodiments, for example, the academic task can be provided to one of the user devices such as, for example, the student device 106-A, and the academic task can be provided by one of the components of the academic integrity system 100 such as, for example, the educational resource 108.

After the academic task has been provided, the process 300 proceeds to block 306 wherein the collection of integrity data is requested. In some embodiments, for example, academic integrity verification can be provided in connection with an academic task. In some embodiments, for example, an academic task may be associated with the request for academic integrity verification. Thus, in one embodiment, an academic task can be associated with an indicator of desired academic integrity verification. If academic integrity verification is requested, then the academic integrity system requests the collection of the integrity data. In some embodiments, for example, the integrity data can be collected by the components of the academic integrity system 100 such as, for example, one of the user devices 106 including, for example, the student device 106-A and/or the camera 110. In some embodiments, for example, the request for the collection of integrity data can include, for example, a request for the camera 110 to collect image data of the actual user performing the academic task.

After the request for the collection of integrity data, the process 300 proceeds to block 308 wherein the integrity data is received. In some embodiments, for example, integrity data can be received by one or more of the components of the academic integrity system 100 such as, for example, the processor 102, one or more of the user devices 106, or one of the databases 104, and in some embodiments, the integrity data can be received by the verification engine 202 of the user device 106.

After the integrity data has been received, the process 300 proceeds to block 310 wherein the profile data is requested.

In some embodiments, for example, the profile data can be requested by one of the components of the academic integrity system 100 such as, for example, processor 102 and/or one or more of the user devices 106. In some embodiments, for example, the profile data can be requested by the verification engine 202 of one or more of the user devices 106. In some embodiments, the profile data can be requested from one of the databases 104, and specifically from the profile database 104-A.

After the profile data has been requested, the process 300 proceeds to block 312 wherein the profile data is received. In some embodiments, for example, the profile data can be received by a component of the academic integrity system 100 such as, for example, the processor 102, one or more of the user devices, and/or one of the components of one or more of the user devices 106 such as, for example, the verification engine 202.

After the profile data has been received, the process 300 proceeds to block 314 wherein the integrity data is evaluated. In some embodiments, for example, the integrity data can be evaluated by comparing the received integrity data to receive a profile data. In some embodiments, for example, the comparison of the integrity data to the profile data can include determining the likelihood that the actual user is the alleged user. In some embodiments, in which the integrity data includes one or several photographs, the evaluation of the integrity data can include an evaluation of clothing worn by the actual user, the location surrounding the actual user, or the like. In one embodiment, for example, a discrepancy in the clothing style or location between the integrity data and the profile data may indicate that the actual user is not the alleged user. In some embodiments, for example, the evaluation of the integrity data can be performed by a component of the academic integrity system 100 such as, for example, the processor 102, one or more of the user devices 106, and/or a component of one or more of the user devices 106 such as, for example, the verification engine 202.

After the integrity data has been evaluated, the process 300 proceeds to block 316 wherein an indicator of academic integrity is provided. In some embodiments, for example, an indicator of academic integrity can be provided to the profile data stored in the profile database 104-A. In some embodiments, for example, the indicator of academic integrity can be provided to a user via the user device 106 and/or to the educational resource 108.

Figure 4:
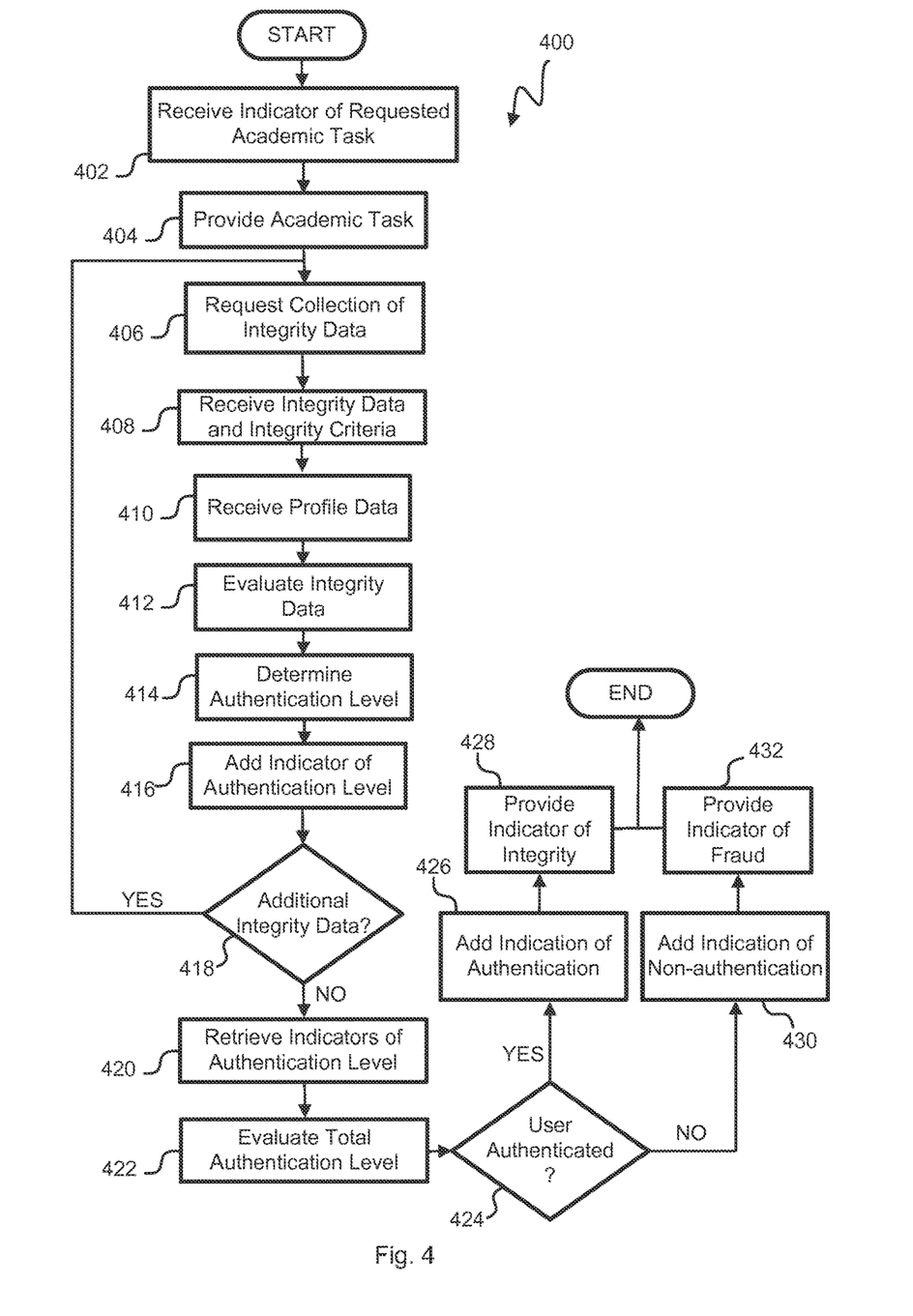
FIG. 4 is a flowchart illustrating one embodiment of a process for evaluation control.

With reference now to FIG. 4, a flowchart illustrating one embodiment of a process 400 for authenticating a user is provided. The process 400 begins at block 402 wherein an indicator of a requested academic task is received. In some embodiments, for example, the indicator the requested academic task can be received by the processor 102 of the academic integrity system 100. In some embodiments, for example, the indicator of the request academic task can be received from one of the user devices 106 such as, for example, the student device 106-A. In some embodiments, for example, the indicator of the requested academic task can be received from the educational resource 108.

After the indicator of the requested academic task has been received, the process 400 proceeds to block 404 wherein the academic task is provided. In some embodiments, for example, the academic task can be provided to one of the user devices such as, for example, the student device 106-A, and the academic task can be provided by one of the components of the academic integrity system 100 such as, for example, the educational resource 108.

After the academic task has been provided, the process 400 proceeds to block 406 wherein the collection of integrity data is requested. In some embodiments, for example, academic integrity verification can be provided in connection with an academic task. In some embodiments, for example, an academic task may be associated with the request for academic integrity verification. Thus, in one embodiment, an academic task can be associated with an indicator of desired academic integrity verification. If academic integrity verification is requested, then the academic integrity system requests the collection of the integrity data. In some embodiments, for example, the integrity data can be collected by the components of the academic integrity system 100 such as, for example, one of the user devices 106 including, for example, the student device 106-A and/or the camera 110. In some embodiments, for example, the request for the collection of integrity data can include, for example, a request for the camera 110 to collect image data of the actual user performing the academic task.

After the request for the collection of integrity data, the process 400 proceeds to block 408 wherein the integrity data and integrity criteria are received. In some embodiments, for example, the integrity data and integrity criteria can be received by one or more of the components of the academic integrity system 100 such as, for example, the processor 102, one or more of the user devices 106, or one of the databases 104, and in some embodiments, the integrity data can be received by the verification engine 202 of the user device 106. In some embodiments, for example, the integrity data can be received from, for example, a component of the academic integrity system 100 such as, for example, the user interface 206 of the user device 106 and/or the camera 110. In some embodiments, for example, the integrity criteria can be received from one of the databases such as, for example, the verification database. In some embodiments, for example, the integrity criteria can comprise one or several thresholds. These thresholds can delineate the circumstances in which an actual user is identified as being the alleged user and in which an actual user is identified as not being the alleged user.

After the integrity data and integrity criteria are received, the process 400 proceeds to block 410 wherein the profile data is received. In some embodiments, for example, block 410 can include the request for profile data as well as the receipt of profile data. In some embodiments, for example, the profile data can be requested from one or more of the components of the academic integrity system 100 such as, for example, the profile database 104-A. In some embodiments, for example, profile data can be received by a component of the academic integrity system 100 such as, for example, the processor 102, one or more of the user devices, and/or one of the components of one or more of the user devices 106 such as, for example, the verification engine 202.

After the profile data has been received, the process 400 proceeds to block 412 wherein the integrity data is evaluated. In some embodiments, for example, the integrity data can be evaluated by comparing the received integrity data to received profile data. In some embodiments, for example, the comparison of the integrity data to the profile data can include determining the likelihood that the actual user is the alleged user. In some embodiments, for example, the evaluation of the integrity data can be performed by a component of the academic integrity system 100 such as, for example, the processor 102, one or more of the user devices 106, and/or a component of one or more of the user devices 106 such as, for example, the verification engine 202.

After the integrity data has been evaluated, the process 400 proceeds to block 414 wherein an authentication level is determined. In some embodiments, for example, the determination of the authentication level can include the generation of the score. This score can reflect the likelihood that an alleged user is the actual user. In some embodiments, for example, this score can be based on the similarities and differences between the profile data and the integrity data. The score can be generated and the authentication level can be determined by a component of the integrity system such as, for example, the processor 102, one or more of the user devices 106, and/or the verification engine 202 of one or more of the user devices 106.

After the authentication level has been determined, the process 400 proceeds to block 416 wherein an indicator of the authentication level is added. In some embodiments, for example, the indicator of the authentication level can be added to, for example, one of the databases 104 such as, for example, the profile database 104-A, the integrity database 104-B, and/or the verification database 104-C.

After the indicator of the authentication level has been added, the process 400 proceeds to decision state 418 wherein it is determined if there is additional integrity data. The determination of whether there is additional integrity data can be made to determine how many types of integrity data to use in authenticating the actual user.

The integrity data and profile data can be of one or several types. In some embodiments, for example, these types can be defined by the aspect of the actual and/or alleged user that they characterize. Thus, for example, in some embodiments, these types may include data relating to a physical attribute, data relating to a performance attribute, and/or data relating to an interaction. Similarly, each of these types can be further divided into subtypes. In some embodiments, for example, the data type can correspond to one or several grouped data aspects that are useful in identifying the actual user. In some embodiments, these types can be associated with a value indicative of a likelihood of the type of integrity data being used to successfully identify the actual user.

In some embodiments, the identification and/or authentication of the actual user can be based on one or more of these types. Thus, for example, in some embodiments the identity of the actual user can be determined by comparing a physical characteristic of the actual user with physical characteristics of the alleged user stored in the profile data, and in some embodiments the identity of the actual user can be determined by comparing nonphysical characteristics such as, for example, the performance attribute of the actual user with performance attributes of the alleged user stored in the profile data. Thus, the identity of the actual user can be determined, using different types of integrity data. In some embodiments, for example, multiple types of integrity data can be used in identifying the actual user. In such an embodiment, for example a physical attribute and a performance attribute of the actual user can be compared with the physical attribute and a performance attribute of the alleged user stored in the profile data. In some embodiments, the integrity data can be used to determine if a person, in addition to the actual user, is involved in and/or present during the completion of the academic task. In some embodiments, this can be determined by the presence of a second person in one or several photographs or video segments, by the detection of a second voice or sounds from a second human via a microphone, and/or the detection of one or several behaviors indicative of communication such as, for example, repeated looking in a certain direction, hand gestures, facial expressions, body language, the combination of repeated looking in a certain direction and one or more of hand gestures, facial expressions, and body language, or the like.

In some embodiments, one or more of the components of the academic integrity system 100 can be used to determine if there is an additional integrity data. In some embodiments, this determination can include identifying received un-evaluated integrity data. In some embodiments, for example, this identification can be performed by the processor 102, by one or more of the user devices 106, and/or by the verification engine 202 of one or more of the user devices 16. If it is determined that there is additional integrity data, the process can return to block 406.

If it is determined there is no additional integrity data, the process 400 proceeds to block 420 wherein indicators of the authentication level are retrieved. In some embodiments, for example, the indicator of the authentication level can be retrieved from, for example, one of the databases 104 such as, for example, the profile database 104-A, the integrity database 104-B, and/or the verification database 104-C.

After the indicators of the authentication level are retrieved, the process 400 proceeds to block 422 wherein the total authentication level is evaluated. In some embodiments, for example, the evaluation the total authentication level can include the comparison of a single indicator of the authentication level and/or the comparison of a combination of a plurality of indicators of the authentication level to the integrity criteria. In some embodiments, for example, this comparison can be performed according to a Boolean function, wherein an authentication level defined as authenticated by the integrity criteria can be assigned a first Boolean value and an authentication level defined as unauthenticated by the integrity criteria can be assigned a second Boolean value. In some embodiments, for example, this comparison can be made by a component of the academic integrity system 100 such as, for example, the processor 102, one or more of the user devices 106, and/or the verification engine 202 of one or more of the user devices 106.

After the total authentication level has been evaluated, the process 400 proceeds to decision state 424 wherein it is determined if the user is authenticated. In some embodiments, for example, this determination can be made by a component of the academic integrity system 100 such as, for example, the processor 102 and/or one or more of the user devices 106 or components thereof. In some embodiments, this determination can include retrieving the assigned Boolean value and determining whether the Boolean value is indicative of the identification of the actual user as the alleged user or of the identification of the actual user as different from the actual user.

If the user is authenticated in that the actual user is identified as the alleged user, then the process 400 proceeds to block 426 wherein an indication of authentication is added. In some embodiments, for example, the indication of authentication can be added to one of the databases 104 of the academic integrity system 100 such as, for example, the profile database 104-A.

After the indication of authentication has been added, the process proceeds to block 428 wherein an indicator of integrity is provided. In some embodiments, for example, the indicator of integrity can be provided to the profile data stored in the profile database 104-A. In some embodiments, for example, the indicator of academic integrity can be provided to a user via the user device 106 and/or to the educational resource 108.

Returning again to decision state 424, if it is determined that the user is not authenticated, then the process 400 proceeds to block 430 wherein an indication of non-authentication is added. In some embodiments, for example, the indication of non-authentication can be added to one of the databases 104 of the academic integrity system 100 such as, for example, the profile database 104-A.

After the indication of non-authentication has been added, the process proceeds to block 432 wherein an indicator of fraud is provided. In some embodiments, for example, the indicator of fraud can be provided to the profile data stored in the profile database 104-A. In some embodiments, for example, the indicator of fraud can be provided to a user via the user device 106 and/or to the educational resource 108.

Figure 5:
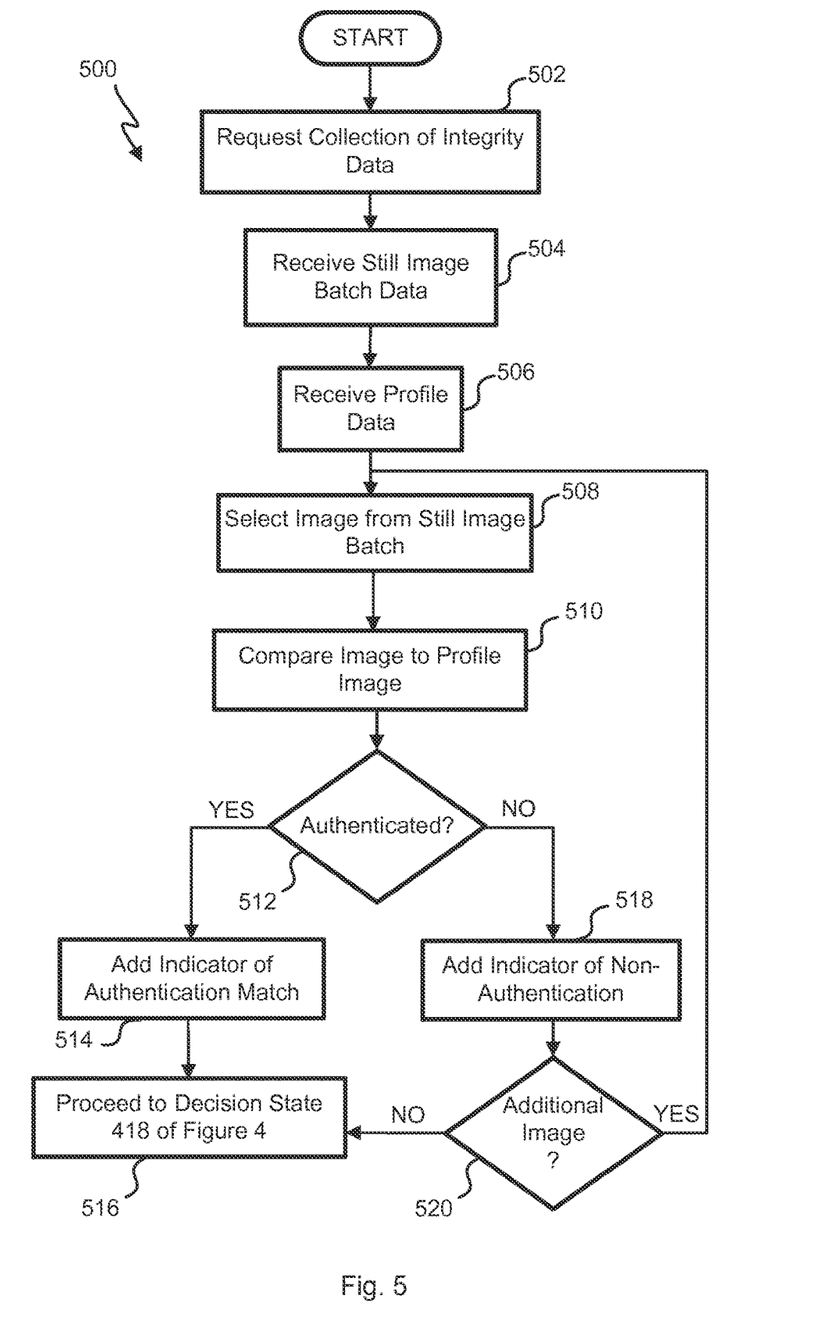
FIG. 5 is a flowchart illustrating one embodiment of a process for generating evaluation data.

With reference now to FIG. 5, a flowchart depicting one embodiment of a process 500 for academic integrity protection with image batches is provided. The process 500 begins at block 502 wherein the collection of integrity data is requested. In some embodiments, for example, academic integrity verification can be provided in connection with an academic task. In some embodiments, for example, an academic task may be associated with the request for academic integrity verification. Thus, in one embodiment, an academic task can be associated with an indicator of desired academic integrity verification. If academic integrity verification is requested, then the academic integrity system requests the collection of the integrity data.

After the collection of integrity data has been requested, the process 500 proceeds to block 504 wherein still image batch data is received. In some embodiments, for example, the still image batch data can be received from, for example, the camera 110. In some embodiments, the still image batch data can comprise a batch of still images. This batch can include, for example, 2, 3, 4, 5, 6, 7, 8, 9, 10, 20, 50, 100, or any other or intermediate number of still images. Advantageously, for example, the collection of the batch of still images can increase the accuracy of the academic integrity system 100 by decreasing the likelihood of a false positive and/or false-negative due to a non-ideal image.

After the still image batch data has been received, the process 500 proceeds to block 506 wherein profile data is received. The profile data can include, for example, one or several profile images. These images can be image data of the alleged user. In some embodiments, for example, profile data can be received by a component of the academic integrity system 100 such as, for example, the processor 102, one or more of the user devices, and/or one of the components of one or more of the user devices 106 such as, for example, the verification engine 202.

After the profile data has been received, the process proceeds to block 508 wherein an image is selected from the still image batch. In some embodiments, for example, the image can be selected by a component of the academic integrity system 100 such as, for example, the processor 102 and/or one or more of the user devices 106 or component thereof.

After the image has been selected, the process 500 proceeds to block 510 wherein the selected image is compared to the profile image. In some embodiments, for example, the selected image can be compared to the profile image by a component of the academic integrity system 100 such as, for example, the processor 102 and/or one or more of the user devices 106 or a component thereof. In some embodiments, for example, a value representing the authentication level can be generated based on the comparison of the selected image and the profile image. This value can reflect the likelihood that the actual user depicted in the selected image is the alleged user depicted in the profile image.

In some embodiments, for example, this comparison of the selected image and the profile image can further include the comparison of the authentication level with the integrity criteria. This comparison can be performed according to a Boolean function, wherein an authentication level defined as authenticated by the integrity criteria can be assigned a first Boolean value and an authentication level defined as unauthenticated by the integrity criteria can be assigned a second Boolean value. In some embodiments, for example, this comparison can be made by a component of the academic integrity system 100 such as, for example, the processor 102, one or more of the user devices 106, and/or the verification engine 202 of one or more of the user devices 106.

After the selected images are compared to the profile image, the process proceeds to decision state 512 wherein it is determined if the actual user is authenticated. In some embodiments, for example, this determination can be made by a component of the academic integrity system 100 such as, for example, the processor 102 and/or one or more of the user devices 106 or components thereof. In some embodiments, this determination can include retrieving the assigned Boolean value and determining whether the Boolean value is indicative of the identification of the actual user as the alleged user or of the identification of the actual user as different than the actual user.

If the actual user is authenticated, the process proceeds to block 514 wherein an indicator of the image match is added. In some embodiments, for example, the indicator of the image match can be added to one of the databases 104 such as, for example, the profile database 104-A. After the indicator of image match has been added, the process 500 proceeds to block 516 and returns to decision state 418 of FIG. 4.

Returning again to decision state 512, if it is determined that the actual user is not authenticated, the process proceeds to block 518 wherein an indicator of the non-authentication of the actual user is added. In some embodiments, for example, the indicator of the image non-match can be added to one of the databases 104 such as, for example, the profile database 104-A.

After the indicator of the non-authentication is added, the process 500 proceeds to decision state 520 wherein it is determined if there is an additional image in the image batch. In some embodiments, for example, this determination can be made by a component of the academic integrity system 100 such as, for example, the processor 102 and/or one or more of the user devices 106 or components thereof. If it is determined that there is an additional image, the process returns to block 508. If it is determined that there is no additional image, then the process proceeds to block 516 and returns to decision state 418 of FIG. 4.

Figure 6:
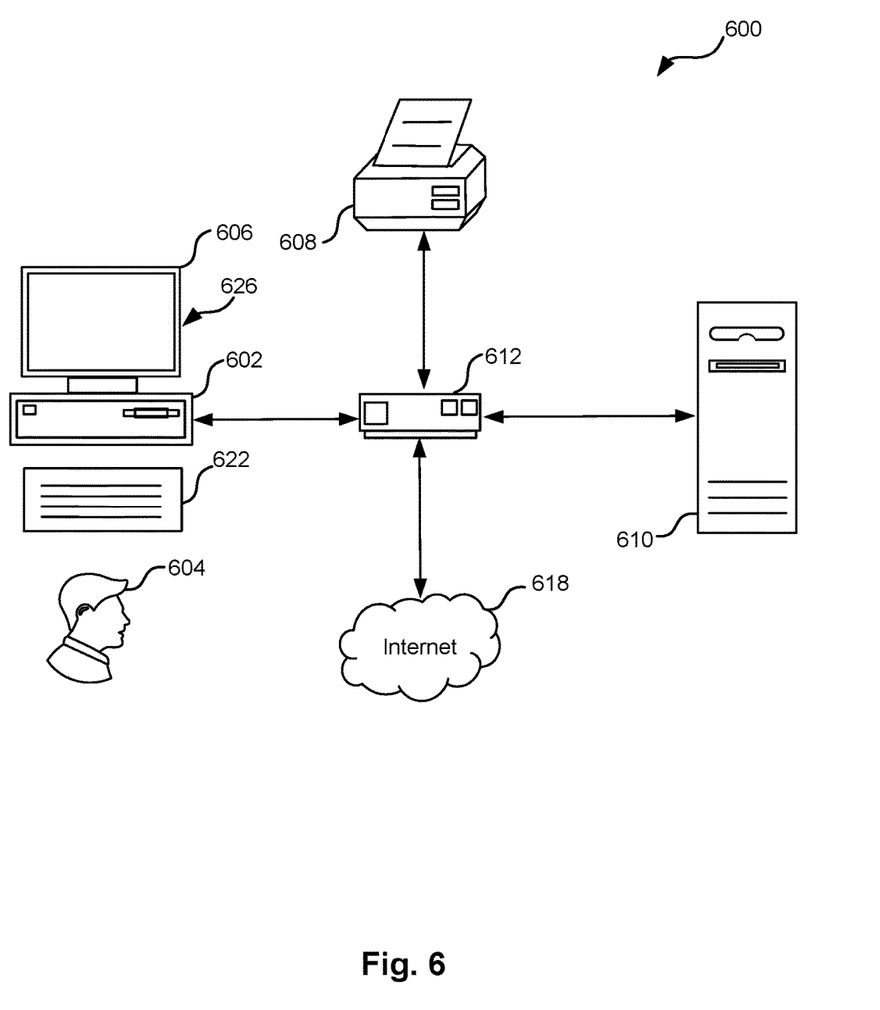
FIG. 6 is a block diagram illustrating one embodiment of a computer system.

With reference now to FIG. 6, an exemplary environment with which embodiments may be implemented is shown with a computer system 600 that can be used by a user 604 as all or a component of a program optimization system 100. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a CRT, flat screen, etc.

A user 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
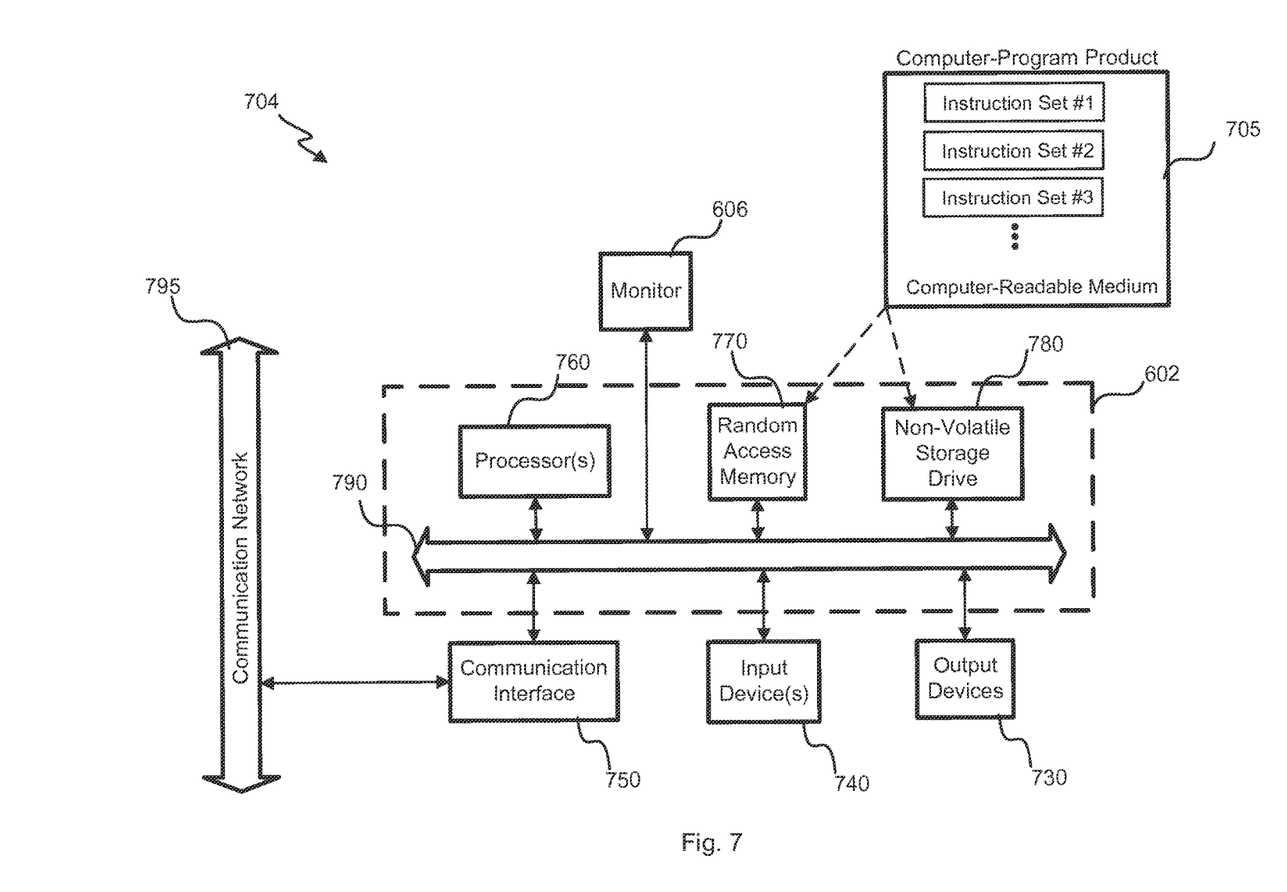
FIG. 7 is a block diagram illustrating one embodiment of a special-purpose computer.

With reference to FIG. 7, an embodiment of a special-purpose computer system 704 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 704.

Special-purpose computer system 704 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 704 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks 795 and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for protection of academic integrity, the method comprising:
   providing, by an academic integrity system with a processor via a communication network to a user device, an activity associated with a course of study, wherein a user device is enabled to present the activity at a user interface of the user device to an alleged user;
   activating a sensor at the user device that is communicatively connected with the academic integrity system;
   receiving, by the academic integrity system, (1) an image-based biometric indicator of the alleged user performing the activity collected by the sensor and (2) a dynamic pattern of providing input to the user interface of the user device by the alleged user;
   receiving, by the academic integrity system, user profile data of an actual user, wherein the user profile data includes (1) an indicator of a physical attribute of the actual user and (2) a stored pattern of providing input of the actual user;
   comparing, by the academic integrity system, the image-based biometric indicator of the alleged user with the indicator of a physical attribute of the actual user;
   generating an authentication score indicating a likelihood that the alleged user is the actual user performing the activity based at least in part on the first comparison;
   comparing, by the academic integrity system, the dynamic pattern of providing input to the user interface of the user device by the alleged user with the stored pattern of providing input of the actual user;
   determining an overall integrity score from the authentication score based at least in part on the second comparison;
   receiving an academic integrity criterion threshold;
   comparing, by the academic integrity system, the overall integrity score to the academic integrity criterion threshold;
   upon determining that the overall integrity score fails to exceed the academic integrity criterion threshold, transmitting an indicator of fraud by the academic integrity system to the user interface of the user device via the communication network, and
   when the indicator of fraud identifies a non-authentication of the alleged user, requesting collection, using the sensor, of an additional image-based biometric indicator of the alleged user.

2. The method of claim 1, further comprising receiving an indication of a completion of the activity.

3. The method of claim 2, wherein the (1) the image-based biometric indicator of the alleged user performing the activity collected by the sensor and (2) the dynamic pattern of providing input to the user interface of the user device by the alleged user is collected during a time period between when the activity is provided and when the indication of the completion of the activity is received.

4. The method of claim 3, wherein the image-based biometric indicator the alleged user comprises at least one digital photograph collected by the sensor.

5. The method of claim 4, wherein the at least one digital photograph comprises a first digital photograph generated at a first moment during a time period between when the activity is provided and when an indication of a completion of the activity is received and a second digital photograph generated at a second moment during the time period.

6. The method of claim 1, wherein the authentication score is a first score and further comprising generating a second score indicating the likelihood that the alleged user is the actual user performing the activity by comparing a second image-based biometric indicator or a dynamic pattern of providing input to the user profile data.

7. The method of claim 6, further comprising generating a composite score by combining the first and second scores indicating the likelihood that the alleged user is the actual user performing the activity.

8. The method of claim 1, wherein the image-based biometric indicator is dynamically collected while the alleged user is performing the activity associated with the course of study.

9. The method of claim 1, wherein the image-based biometric indicator of the alleged user is associated with a second person in addition to the alleged user.

10. The method of claim 1, further comprising:
    receiving a batch of still images of the alleged user, wherein each image of the batch of still images is collected at a different time during the performance of the activity.

11. The method of claim 1, wherein the sensor is a camera that is controllable by the academic integrity system via the communication network.

12. An academic integrity system comprising:
    a processor for executing program instructions; and
    a memory storing the program instructions, the program instructions being executed by the processor to perform a process to:
    provide an activity associated with a course of study, wherein a user device is enabled to present the activity at a user interface of the user device to an alleged user;
    activate a sensor at the user device that is communicatively connected with the academic integrity system;
    receive (1) an image-based biometric indicator of the alleged user performing the activity collected by the sensor and (2) a dynamic pattern of providing input to the user interface of the user device by the alleged user;
    receive user profile data of an actual user, wherein the user profile data includes (1) an indicator of a physical attribute of the actual user and (2) a stored pattern of providing input of the actual user;
    compare the image-based biometric indicator of the alleged user with the indicator of a physical attribute of the actual user;
    generate an authentication score indicating a likelihood that the alleged user is the actual user performing the activity based at least in part on the first comparison;
    compare the dynamic pattern of providing input to the user interface of the user device by the alleged user with the stored pattern of providing input of the actual user;

determine an overall integrity score from the authentication score based at least in part on the second comparison;
receive an academic integrity criterion threshold;
compare the overall integrity score to the academic integrity criterion threshold;
upon determining that the overall integrity score fails to exceed the academic integrity criterion threshold, transmit an indicator of fraud to the user interface of the user device; and
when the indicator of fraud identifies a non-authentication of the alleged user, request collection, using the sensor, of an additional image-based biometric indicator of the alleged user.

13. The academic integrity system of claim 12, wherein the processor is further configured to receive an indication of a completion of the activity.

14. The academic integrity system of claim 13, wherein the processor is further configured to collect the (1) the image-based biometric indicator of the alleged user performing the activity collected by the sensor and (2) the dynamic pattern of providing input to the user interface of the user device by the alleged user during a time period between when the activity is provided and when the indication of the completion of the activity is received.

15. The academic integrity system of claim 12, wherein the authentication score is a first score and wherein the processor is further configured to generate a second score indicating the likelihood that the alleged user is the actual user performing the activity by comparing a second image-based biometric indicator or a dynamic pattern of providing input to the user profile data.

16. The academic integrity system of claim 15, wherein the processor is configured to generate a composite score by combining the first and second scores indicating the likelihood that the alleged user is the actual user performing the activity.

17. A method for protection of academic integrity, the method comprising:
providing with a processor, an activity associated with a course of study, wherein a user device is enabled to present the activity at a user interface of the user device to an alleged user;
activating a sensor at the user device that is communicatively connected with the processor;
receiving with the processor, (1) an image-based biometric indicator of the alleged user performing the activity collected by the sensor and (2) a dynamic pattern of providing input to the user interface of the user device by the alleged user;
receiving with the processor, user profile data of an actual user, wherein the user profile data includes (1) an indicator of a physical attribute of the actual user and (2) a stored pattern of providing input of the actual user;
comparing the image-based biometric indicator of the alleged user with the indicator of a physical attribute of the actual user;
generating with the processor, an authentication score indicating a likelihood that the alleged user is the actual user performing the activity based at least in part on the first comparison;
comparing the dynamic pattern of providing input to the user interface of the user device by the alleged user with the stored pattern of providing input of the actual user;
determining an overall integrity score from the authentication score based at least in part on the second comparison;
receiving with the processor, an academic integrity criterion threshold;
comparing with the processor, the overall integrity score to the academic integrity criterion threshold;
upon determining that the overall integrity score fails to exceed the academic integrity criterion threshold, transmitting with the processor an indicator of fraud to the user interface of the user device; and
when the indicator of fraud identifies a non-authentication of the alleged user, requesting collection, using the sensor, of an additional image-based biometric indicator of the alleged user.

18. The method of claim 17, further comprises:
determining that the dynamic pattern of providing input to the user interface of the user device by the alleged user allows a desired degree of certainty that the alleged user is not the actual user; and
requesting additional data based at least in part on the determination.

19. The method of claim 18, wherein the additional data comprises a type, wherein the type is one of an indicator of a physical attribute of the alleged user, an indicator of a performance attribute of the alleged user, and an indicator of an interaction attribute of the alleged user.

20. The method of claim 19, wherein the type of the additional data is selected based on a uniqueness parameter, wherein the uniqueness parameter specifies the desired degree of certainty to which the type of the additional data uniquely identifies the alleged user.

* * * * *